United States Patent [19]

Seto et al.

[11] Patent Number: 4,477,472

[45] Date of Patent: Oct. 16, 1984

[54] PROCESS FOR PREPARING POWDERED OIL AND FAT

[75] Inventors: Akiro Seto; Muneo Sakai; Takashi Sakita, all of Kanagawa, Japan

[73] Assignee: Nissin Oil Mills, Ltd., Tokyo, Japan

[21] Appl. No.: 338,719

[22] Filed: Jan. 11, 1982

[30] Foreign Application Priority Data

Jan. 9, 1981 [JP] Japan ................................. 56-1132

[51] Int. Cl.$^3$ ............................................... A23L 1/20
[52] U.S. Cl. ......................................... 426/98; 426/46
[58] Field of Search ................................. 426/46, 98

[56] References Cited

U.S. PATENT DOCUMENTS

| | | | |
|---|---|---|---|
| 2,913,342 | 11/1959 | Cameron et al. | 426/98 |
| 3,295,986 | 1/1967 | Saslaw et al. | 426/98 |
| 3,393,075 | 7/1968 | Hayashi et al. | 426/98 X |
| 3,565,819 | 2/1971 | Gragger | 426/98 |
| 3,664,963 | 5/1972 | Pasin | 426/98 X |
| 3,852,480 | 12/1974 | Williams | 426/46 |
| 3,857,966 | 12/1974 | Feldman et al. | 426/46 X |
| 4,042,718 | 8/1977 | Rawlings et al. | 426/98 X |
| 4,217,370 | 8/1980 | Rawlings et al. | 426/98 |
| 4,324,805 | 4/1982 | Olsen | 426/46 |

FOREIGN PATENT DOCUMENTS 3003679  8/1981  Fed. Rep. of Germany ........ 426/46

*Primary Examiner*—Helen M. S. Sneed
*Attorney, Agent, or Firm*—Sughrue, Mion, Zinn, Macpeak & Seas

[57] ABSTRACT

A stable, powdered oil/fat of uniform size having a high oil/fat content is prepared by hydrolyzing partially a soybean protein with an acid or a protease to obtain an aqueous solution of protein, adding an oil/fat to said solution to obtain an O/W emulsion and spray-drying said emulsion. When a soybean protein treated with hydrous alcohol is employed, the product obtained has the improved flavor and color suitable for edibles.

4 Claims, No Drawings

PROCESS FOR PREPARING POWDERED OIL AND FAT

BACKGROUND OF THE INVENTION

The present invention relates to a process for preparing a powdered oil/fat and particularly, to the same which comprises spray-drying an O/W emulsion containing a partially hydrolyzed soybean protein as an emulsifier and also as a coating substance.

Powdered fats are used as materials of cake mix, doughnut mix, instant food and the like and are recently in great demand. Powdered fats have been prepared by pulverizing a fat having a high melting point at low temperature or by mixing an oil/fat with substances such as modified starch or cellulose. Such processes, however, have some disadvantages. In the former process a highly hydrogenated oil having a melting point of 60°–70° C. must be employed for the convenience of pulverizing, and the powdery product thus obtained is unsatisfactory for use in cake mix and the like because of it being difficult to melt in mouth. In the latter process, the oil/fat bleeds at its high content and therefore, a powdered oil/fat composition having a high oil/fat content cannot be obtained.

In order to overcome the above disadvantages, there has been proposed a process for the preparation of a powdered oil/fat by forming an O/W emulsion with use of an emulsifier, for example sugar esters, proteins such as casein or gelatin, or starches and spray-drying the O/W emulsion (ref. U.S. Pat. Nos. 2,913,342 and 3,393,075). In this process, the powdered fats which are coated with the above-mentioned emulsifier are not in contact with air and therefore, can be stored with good quality for a long time. Also, this product is free-flowing without bleeding of an oil/fat, so that it can be mixed with food materials under dry condition. However, since emulsions using casein or gelatin have a high viscosity in general, the water content should be elevated to the degree of 70–90% by weight to decrease the viscosity in the spray-drying. Accordingly, in this process a great amount of water should be evaporated on spray-drying in order to obtain a powdered oil/fat and accordingly, energy costs are enormous.

SUMMARY OF THE INVENTION

An object of the present invention is to provide a process for preparing a powdered oil/fat in which spray-drying can be effected with an emulsion of lower viscosity and lower water content at low energy cost whereby products of uniform size are obtained with high fat content and without bleeding of oil/fat.

In accordance with the present invention, there is provided a process for preparing a powdered oil/fat which comprises hydrolyzing partially a soybean protein with an acid or a protease to obtain an aqueous solution of protein, adding an oil/fat to said solution to obtain an O/W emulsion and spray-drying said emulsion.

DETAILED DESCRIPTION OF THE INVENTION

Soybean proteins used in the process of the present invention include extracted soybean proteins, soybean protein concentrates, isolated soybean proteins and the like as prepared in conventional methods.

Acids which may be used include hydrochloric acid and sulfuric acid.

Proteases which may be used include an acidic, neutral or alkaline protease such as pepsin, papain, trypsin or Subtilisin BPN'.

The partial hydrolysis of soybean protein with an acid is, for example, effected in an aqueous solution of 1–5% by weight of the protein under the acid concentration of 0.3–3% by weight at 75°–95° C. for 1–50 hours.

The partial hydrolysis with protease is, for example, effected in an aqueous solution of 1–5% by weight of the protein at the protease concentration of 0.03–1.0% by weight based on the solid content at the optimum pH and temperature of the protease for 1–50 hours.

A hydrolysis degree of the partially hydrolyzed soybean protein may be indicated by a solubility of protein in a 5% aqueous solution of trichloroacetic acid (hereinafter referred to as "5% TCA solubilization rate"). In the present invention, the partial hydrolysis is effected until the 5% TCA solubilization rate reaches preferably 15–50%. With the 5% TCA solubilization rate of less than 15%, the emulsification activity and stability of the protein are reduced and also, the viscosity of emulsion becomes too high. On the other hand, with the 5% TCA solubilization rate of more than 50%, the product obtained is of a bitter taste and unsuitable for edible use.

A 5% TCA solubilization rate may be measured as follows:

50 g of a 10% trichloroacetic acid solution are added to 50 g of a partially hydrolyzed soybean protein solution which has 10% protein content and vibrated sufficiently. The resulting precipitates are centrifuged and then, 10 g of the supernatant are sampled. Nitrogen is measured in accordance with Kjeldahl method. A 5% TCA solubilization rate is calculated by the following formula.

$$5\% \text{ TCA Solubilization Rate } (\%) = \frac{\text{Nitrogen (mg) in 10 g of the Supernatant} \times 10}{\text{Total nitrogen (mg) in 50 g of a partially hydrolyzed soybean protein solution}} \times 100$$

Oils/fats which may be used in the process of the present invention include vegetable and animal oils/fats which may be in form of solid or liquid and mixtures thereof.

The O/W emulsion according to the present invention is, for example, prepared as follows:

First, the above-mentioned partially hydrolyzed soybean protein is dissolved in 5–10 fold by weight of water to obtain an aqueous solution of protein. 1–2 parts by weight of liquid oil or melted solid fat is gradually added to 1 part of the aqueous solution and the resulting mixture is emulsified by means of a stirrer such as Homomixer to obtain an O/W emulsion. If desired, the emulsion may be further homogenized by means of a colloid mill or a high pressure homogenizer.

Spray-drying is effected in accordance with the conventional method at an air-supplying temperature of 110°–120° C., at an air-exhausting temperature of 80°–90° C. and at a temperature of materials to be treated of 50°–70° C.

The partially hydrolyzed soybean protein according to the present invention has a great emulsification activity enough to emulsify the oil/fat with water even in a small amount. For example, the oil/fat content of a powdered oil/fat composition containing casein or gelatin as a coating substance is 70–80% by weight, whereas that of the powdered oil/fat composition according to the present invention can be elevated to the range of 90–92% by weight.

Since the protective layer of the partially hydrolyzed soybean protein covering the oil/fat appears to be very strong and accordingly, a powdered oil/fat coated with the protective layer is obtained in a stable form by spray-drying of the emulsion. In the present invention, therefore, any liquid oil may be used to obtain a stable, powdered oil of uniform size without bleeding and blocking, though solid fats are normally used in the preparation of powdered fats by spray-drying.

Conventional soybean proteins are unsatisfactory with respect to the flavor and color as compared with casein or gelatin. This is considered as disadvantageous for edible use. We have now found that this problem is resolved by using a soybean protein in which odorous materials and coloring materials have been removed by treatment with hydrous alcohol. In the alcohol treatment an alcohol concentration is preferably 50–90% by weight.

Since the emulsion with the partially hydrolyzed soybean protein has a very low viscosity, it can be well spray-dried even at a water content of 30–50% by weight. Thus, the process of the present invention is markedly advantageous as compared with the conventional process using casein or gelatin as the emulsifier.

The present invention will be illustrated by the following non-limitative examples. In these Examples, "%" and "part" are indicated by weight.

EXAMPLE 1

A pH of 100 parts of a 5% aqueous solution of isolated soybean protein (crude protein content: 92%) obtained in the conventional method was adjusted to 2.0 by adding hydrochloric acid, 0.005 parts of purified pepsin were added to the solution and the solution was hydrolyzed at 50° C. for 1 hour. The resulting solution was heated for enzymatic inactivation at 135° C. for 5 seconds according to an ultra high temperature-short duration method (UHT method). Then the solution was concentrated under reduced pressure until the protein concentration has reached 10%. Partially hydrolyzed soybean protein thus obtained has a 5% TCA solubilization rate of 25%. 1 part of refined soybean oil was added to 1 part of the above concentrate while stirring at 5000 r.p.m. by means of a Homomixer to obtain an O/W emulsion. The emulsion was homogenized by means of a high pressure homogenizer (pressure: 20 kg/cm$_2$) and then, subjected to a spray-drier (water evaporating rate: 100 kg/hr) at an air-supplying temperature of 120° C., at an air-exhausting temperature of 90° C. and at an emulsion treating rate of 200 kg/hr. Thus, a powdered oil/fat of uniform size having a diameter of 20–50μ was obtained and no bleeding was observed.

EXAMPLE 2

Concentrated hydrochloric acid was added to a 5% aqueous solution of soybean protein concentrate (crude protein content: 67%) obtained in the conventional method in such a manner that the resulting solution had a hydrochloric acid concentration of 1%. The solution was maintained at 85° C. for 10 hours. After neutralization with a 20% aqueous solution of sodium hydroxide, the resulting solution was heated and concentrated in the same manner as in Example 1. Partially hydrolyzed soybean protein thus obtained has a 5% TCA solubilization rate of 40%. 1.2 parts of a hydrogenated soybean oil (melting point: 34° C.) was gradually added to 1 part of the above concentrate while stirring at 5000 r.p.m. by means of a Homomixer to obtain an O/W emulsion. Then the emulsion was spray-dried in the same manner as in Example 1. A powdered oil/fat of uniform size having a diameter of 20–50μ was obtained and no bleeding was observed.

For comparison, O/W emulsions were prepared using a non-hydrolyzed soybean protein concentrate, gelatin or casein as a coating substance in the abovementioned conditions. They have very high viscosity as compared with the emulsion according to the present invention as shown in Table-1 and therefore, it is difficult to spray-dry them.

TABLE-1

| Viscosity of O/W Emulsions | |
|---|---|
| Coating Substance | Viscosity* (cp) |
| partially hydrolyzed soybean protein concentrate | 2000 |
| non-hydrolyzed soybean protein concentrate** | 50000 |
| gelatin | 15000 |
| casein | 12000 |

*determined by means of Brookfield viscometer.
**In this case the emulsion was prepared by adding 0.6 parts of a hydrogenated soybean oil to 1 part of the protein concentrate.

EXAMPLE 3

Isolated soybean protein (crude protein content: 92%) obtained in the conventional method was dispersed in a 5 fold aqueous solution of 80% ethanol and washed at 50° C. for 1 hour. After centrifuging, the resulting precipitates were dried under reduced pressure to obtain a powdered soybean protein. Then 0.01 part of Bioprase (the tradename of Subtilisin BPN' by Nagase & Co., Ltd., Japan) was added to 100 parts of 5% aqueous solution of the powdered soybean protein, a pH of the solution was adjusted to 9.0 by adding ammonia water and the solution was maintained at 55° C. for 2 hours while stirring slowly. The solution was heated and concentrated in the same manner as in Example 1. Partially hydrolyzed soybean protein thus obtained has a 5% TCA solubilization rate of 35%. 1 part of refined rapeseed oil was gradually added to 1 part of the above concentrate while stirring at 5000 r.p.m. by means of a Homomixer to obtain an O/W emulsion. The emulsion was homogenized by means of colloid mill, then spray-dried in the same manner as in Example 1 to obtain a powdered oil/fat of uniform size having a diameter of 20–50μ. No bleeding of the oil was observed. This powdered oil/fat has no soybean-like odor and bitter taste and therefore, is suitable for edible use.

What is claimed is:

1. A process for preparing a powdered oil/fat which comprises partially hydrolyzing a soybean protein with an acid or a protease until the solubility of the protein in a 5% aqueous solution of trichloroacetic acid is in the range of about 15–50%, to obtain an aqueous solution of protein, adding an oil/fat to said solution to obtain an O/W emulsion and spray-drying said emulsion.

2. A process according to claim 1 in which said acid is hydrochloric acid or sulfuric acid.

3. A process according to claim 1 in which said protease is pepsin, papain, trypsin or Subtilisin BPN'.

4. A process according to claim 1 in which said soybean protein is one treated with hydrous alcohol to remove odorous materials and coloring materials.

* * * * *